Figure 1:
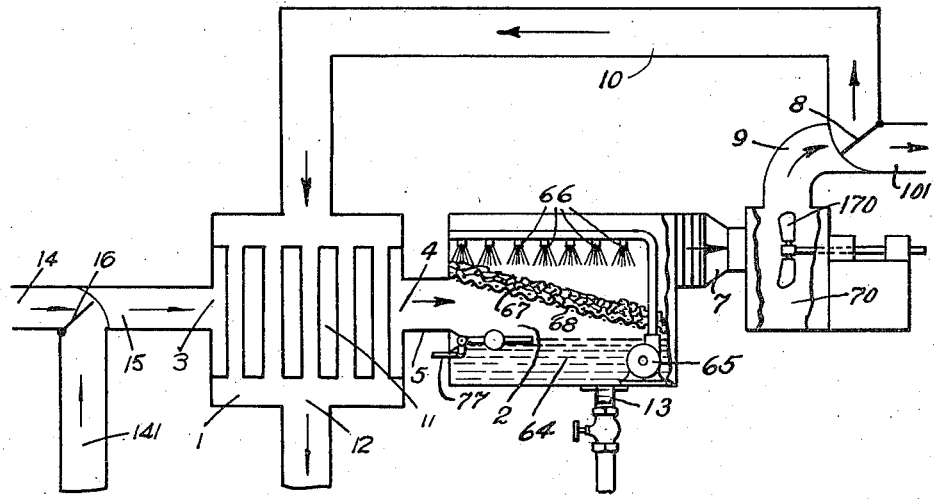

Jan. 14, 1947.   M. BERLOWITZ   2,414,135
COOLING OF GASES OR LIQUIDS
Filed Dec. 20, 1943   2 Sheets-Sheet 1

Inventor
Max BERLOWITZ
By [signature]
his Attorney

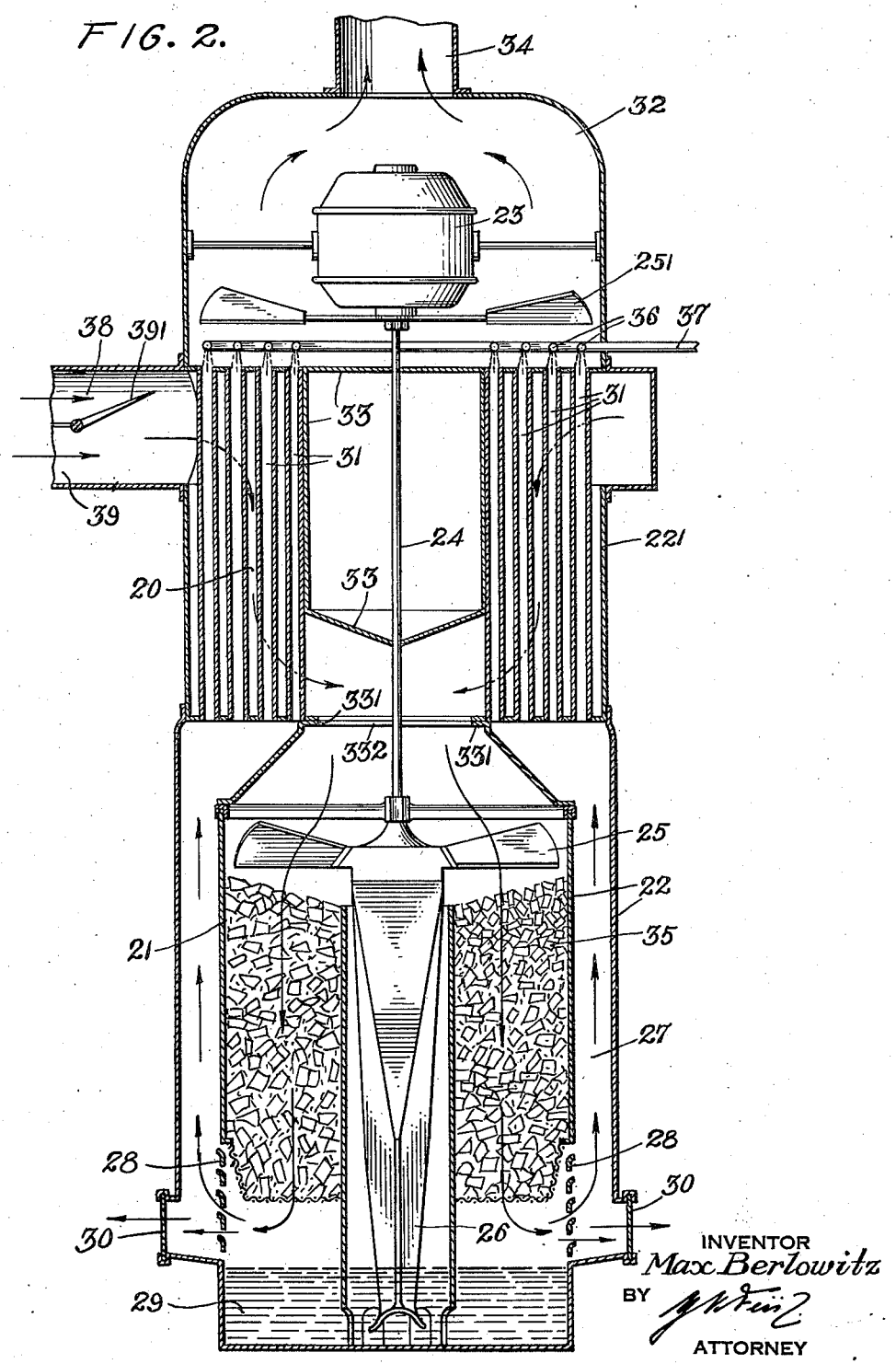

UNITED STATES PATENT OFFICE 2,414,135

COOLING OF GASES OR LIQUIDS

Max Berlowitz, London, England; Elly Berlowitz, administratrix of said Max Berlowitz, deceased Application December 20, 1943, Serial No. 514,901
In Great Britain September 11, 1943

3 Claims. (Cl. 261—10)

The present invention relates to the cooling of gases or liquids, and more particularly, but not exclusively, to the cooling of air or water.

It is an object of the invention to provide a simple method and means for cooling effectively a gas, such as air, or a liquid, such as water.

It is known to cool dry air down to its wet bulb temperature by means of an apparatus in which recirculated water is evaporated into the nonsaturated air which is in direct contact with the water. With such an arrangement the total content of heat in the mixture of air and water vapour remains substantially unchanged. If it is desired to cool the air below its wet bulb temperature, the total heat content has to be reduced. For this purpose, an additional cooling medium was required, the temperature of which had to be some degrees below the desired air temperature. In tropical and sub-tropical zones, such low temperatures can only be obtained by means of refrigerating machines. The costs for installing and running such machines are high.

It is accordingly a further object of the present invention, to provide a simple arrangement for cooling air below its wet bulb temperature down to approximately its dew-point by using only water of any available initial temperature.

It is another object of the invention to cool water, by using only air, down to approximately the dew-point of the air.

Instead of cooling air or water any other non-saturated gas or liquid may be cooled.

The arrangement is particularly simple for cooling air and water in hot, dry climates, that is to say, in climates where the dry bulb temperature of the air is considerably higher than its wet bulb temperature.

Other objects and advantages of the invention will become apparent from the sub-joined detailed description of the invention taken in conjunction with the accompanying drawings, in which:

Fig. 1 illustrates diagrammatically the underlying idea of the present invention, and Fig. 2 illustrates a preferred embodiment of the invention in sectional elevation.

Referring first to Fig. 1 of any conventional construction, the arrangement comprises a dry cooling stage 1 and a wet cooling stage 2. In the specification and claims, the expression "wet cooling stage" shall indicate a cooling stage in which cooling is effected by heat exchange between a liquid, such as water, and a non-saturated gas, such as dry air, which are in direct contact with each other. The expression "dry cooling stage" shall indicate a cooling stage in which cooling is effected by heat exchange between a gas or liquid to be cooled and a cooling medium without the gas or liquid coming in direct contact with the cooling medium.

According to my invention, the dry cooling stage and the wet cooling stage are arranged in such a manner that, in operation, a gas before reaching the wet cooling stage is pre-cooled in the dry cooling stage by means of a gas or liquid cooled in, and derived from, the said wet cooling stage. For this purpose, the dry cooling stage 1 has an inlet 3 and an outlet 4 which is connected by a conduit 5 to an inlet 6 of the wet cooling stage 2 which has an outlet 7. The inlet 3 communicates with a duct 15 leading to two ducts 14 and 141, a damper, slide, or the like 16 being provided, the function of which will be explained further below. The outlet 7 is connected to a chamber 70 containing a fan 170. Said chamber 70 communicates with a duct 9 which leads to two ducts 10 and 101, a damper, slide, or the like 8 being provided, the function of which will be explained further below. The duct 10 communicates with a cooling device 11 in the dry cooling stage 1. For example, the cooling device 11 may consist of cooling tubes. It communicates further with an outlet 12 in the dry cooling stage 1.

For explaining the operation of the arrangement, assume that it is intended to cool the air contained in an enclosure, for example in a room, and that the air to be cooled has a dry bulb temperature of 95° F. and a wet bulb temperature of 70° F. corresponding to a dew-point of 57° F. The water available for the wet cooling stage 2 may have an initial temperature of 77° F. In this case, the inlet 3 of the dry cooling stage 1 communicates with the enclosure (not shown) to be cooled through the duct 14 and with the open air through the duct 141. The outlet 7 communicates with the enclosure through the duct 101. The outlet 12 communicates with the open air. By means of one or more fans or the like (not shown) air is drawn through the duct 14 from the enclosure and through the duct 141 from the outside, the mixture of inside and outside air being controlled by the position of the damper or the like 16. The air mixture is conducted through the inlet 3 into the dry cooling stage 1, flows through the dry cooling stage 1 and reaches the wet cooling stage 2. The reservoir 64 of said wet cooling stage is filled with water which is, by means of a pump 65 and jets 66, sprayed into the space of part 2 and onto a layer of filling bodies 67 resting on a sieve or the like 68. Thus in the space of part 2 a mist is created by the water sprayed into the space, which mist partly evaporates into the air streaming through part 2 and, thus, cools the air by evaporation of the water into the air, while the air is in direct contact with the water. A float valve 77 enables the loss of water in the reservoir 64 to be automatically replaced from a water supply source (not shown). The air leaving the wet cooling stage 2 at its outlet 7 is saturated with moisture and is cooled at the beginning to the water temperature of 77° F. owing to the direct contact between the air and the water in the wet cooling stage 2. Gradually, the temperature of the water in the wet cooling stage 2 and the temperature of the air leaving it drop to the wet bulb temperature of the air, namely to 70° F. The fan 170 in the chamber 70 assists in the transport of the air. By suitably adjusting the damper or the like 8, part of the cooled air, say one third, enters the enclosure to be cooled through the duct 101. The remaining part of the air leaving the outlet 7, in the example two thirds of the air, is conducted through the duct 10 to the dry cooling stage 1, is passed through the cooling device 11, and is discharged from the dry cooling stage 1 through the outlet 12 into the open air. The air mixture entering the dry cooling stage 1 through its opening 3 is now pre-cooled therein, say from 95° F. to about 80° F. before it reaches the wet cooling stage 2. Thereby, the wet bulb temperature of the air is gradually lowered from its initial value of 77° F. to 65.4° F. The drop of the wet bulb temperature, in turn, causes a further decrease of the temperature in the wet cooling stage 2, and so on, until a stationary state is reached at a temperature which lies only a few degrees above the dew-point temperature of 57° F.

While at the beginning of the process the main drop of temperature is effected by evaporation of the water in the wet cooling stage 2, gradually, as the air returned through the conduit 10 becomes cooler, the main drop of the temperature is effected in the dry cooling stage 1, so that when the stationary state has been reached only a fraction of the initial evaporation of water takes place. The amount of water evaporated into the air may be automatically replaced, for example from a supply source, by means of the float valve 77. To shorten the time needed for reaching the stationary state, the damper or the like 8 may initially be so adjusted as to return all the air, which leaves the wet cooling stage 2 through its outlet 7, to the dry cooling stage 1. The duct 101 may be more or less opened by the damper or the like 8 when the stationary state has been reached.

The position of the damper or the like 16 should be so adjusted as to draw into the arrangement at least the same amount of air from the outside as is discharged from the arrangement into the open air through the outlet 12, whereby any drop of the air pressure in the enclosure is avoided.

Since the water contained in the wet cooling stage 2 assumes substantially the same temperature as the air passing therethrough, the arrangement may also be used for cooling water. In this case, the duct 101 is preferably completely shut in order to accelerate the cooling of the water as much as possible; instead of drawing part of the air from an enclosure, the whole of the air may, in this case, be drawn from the outside by suitably adjusting the position of the damper or the like 16. The cooled water may be drawn from the wet cooling stage 2 at a suitable water outlet 13 and may be replaced by fresh water. For example, the wet cooling stage may be connected to a water storage tank. Or the water to be cooled may be drawn from a tank installed below the ground, and the cooled water returned to the tank, for example, by means similar to the arrangement described in my British patent specification No. 448,538.

From the foregoing description, it will be seen that my invention also consists in a method of cooling air or water, wherein dry air is brought into direct contact with water and is cooled and moistened by the evaporation of water, at least part of the cooled moist air being employed to pre-cool the dry air without coming in direct contact with the dry air, the pre-cooling of the dry air being effected before it reaches the water so as to reduce the wet bulb temperature of the dry air and, thus, to enable the dry air to be cooled down to approximately its dew-point.

The apparatus illustrated in Fig. 2, which will now be described, comprises two parts generally denoted by numerals 20 and 21, part 20 being arranged on top of, and in vertical alignment with, part 21. Part 20 includes a dry, and part 21 a wet cooling stage. The wet cooling stage may consist of an apparatus somewhat similar to that described in my British patent specifications Nos. 434,671 and 456,771. A motor 23 drives a flexible shaft 24 on which are rigidly fixed two fans 25 and 251 for driving a stream of air through the arrangement as indicated by the arrows and for driving also a centrifugal pump 26 for circulating water irrigating filling bodies 35 through the wet cooling stage. The wet cooling stage is surrounded by a double wall 22 providing a passage 27 for air. Towards the bottom baffles 28 are arranged for preventing any water drops reaching the passage 27. The passage 27 has openings which may be wholly or partly closed by dampers, hit and miss slides, or the like 30. A water reservoir 29 is arranged below the baffles 28. The top of the passage 27 communicates with the interior of cooling tubes 31 of the dry cooling stage, which are housed in a casing 221 having two inlets 38 and 39 adapted to communicate respectively by means of ducts (not shown) or the like with an enclosure to be cooled and with the outside air. A damper or the like 391 is provided which controls the inlets 38 and 39. The cooling tubes 31 open at the top into a space 32 communicating with the outside through a duct as outlet 34. The space 32 is separated from the lower part of the arrangement by partition walls 33. A circular rim 331 having an opening 332 is arranged between the dry cooling stage 20 and the wet cooling stage 21. Opposite the open ends of the cooling tubes 31, jets 36 are provided which are connected to a water supply source (not shown) by means of a tube 37.

In operation, air is drawn into the part 20 containing the dry cooling stage by the fans 25 and 251 through the inlets 38 and 39. When, for example, the inlet 38 communicates with an enclosure or place of utilization to be cooled, and the inlet 39 with the open air, either air from the enclosure, or from the outside, or a mixture of outside and inside air may be drawn into part 20 containing the dry cooling stage, in accordance with the position of the damper or the like 391. The air drawn in is conducted along the outside of the cooling tubes 31 downwards into the part 21 containing the wet cooling stage through the opening 332. Simultaneously, as described more fully in my British patent specifications Nos. 434,671 and 456,771, referred to above, water is pumped by the centrifugal pump 26 from the reservoir 29 and irrigates the filling bodies 35 along which the air stream passes. The air cooled in the wet cooling stage leaves the part 21 through the baffles 28. A part of the cooled air leaves the apparatus through the openings controlled by the adjustment of the dampers or the like 30 for discharge into the place of utilization, while the rest ascends in the passage 27, and passes through the interior of the cooling tubes 31 in counter flow to the air conducted along the outside of the cooling tubes 31. The air then enters the space 32 and leaves the dry cooling stage through the duct or outlets 34 for discharge into the open air. By arranging the motor 23 in the space 32, as shown, the motor is cooled by the air just before it is discharged to the outside. The air, when entering the cooling tubes 31, has been cooled and saturated with moisture in the wet cooling stage and is warm when leaving the tubes 31 owing to the exchange of heat through the walls of the tubes 31 in the dry cooling stage. In order to increase the cooling effect in the dry cooling stage, water is passed from the jets 36 into the cooling tubes 31 in a counter-flow to the flow of cooling air through these tubes. The water is evaporated by direct contact with the cooling air which is thereby saturated with moisture, and, thus, kept cool. Preferably, the amount of water passed into the cooling tubes is such that the water is entirely evaporated in the tubes 31 at the lower end of the tubes. However, if water reaches the lower end of the tubes 31 it will drip through the passage 27 and will eventually be collected in the reservoir 29. From the foregoing description, it will be seen that the dry cooling stage is combined with an auxiliary wet cooling stage which serves to keep the cooling medium cool during its passage through the dry cooling stage.

By means of the arrangement of Fig. 2, the air and the water are cooled in the main wet cooling stage to approximately the dew-point of the air in the manner described above with reference to Fig. 1; the arrangement may be used to supply cooled air and/or cooled water.

I have described preferred embodiments of my invention, but it is clear that numerous changes and omissions may be made without departing from the spirit of my invention. For example, instead of air and water, any other suitable gas or liquid may be cooled in the manner described. Furthermore, if desired the jets 36 and tube 37 (Fig. 2), and thereby the additional moistening and cooling of the air passing through the tubes 31 may be dispensed with.

The arrangements described may be used for cooling the air in small premises or for cooling water required for household purposes, or alternatively, for cooling the air in large premises, such as office buildings, factories, for the cooling of electric machines, and for cooling large quantities of water such as are required for industrial purposes, for example in dairies, in the manufacture of rubber, tyres, soap, food, beverages.

I claim:

1. An apparatus for cooling a gaseous medium comprising a casing having a first chamber, a second chamber and a third chamber, a dry cooling stage arranged in said first chamber, a wet cooling stage arranged in said second chamber, said dry cooling stage and said wet cooling stage being in alignment with each other, said first chamber having an inlet for the admission of a raw gaseous medium to be cooled, said second chamber having an opening capable of discharging a portion of the cooled gaseous medium into the place of utilization, controlling means in said opening for controlling the amount of cooled gaseous medium to be discharged through said opening, said third chamber having an outlet for the discharge of the remaining portion of the gaseous medium, said chamber and casing having means for conducting the raw gaseous medium from said inlet to and through said dry cooling stage, and for conducting the gaseous medium cooled in said dry cooling stage from the latter to and through said wet cooling stage and means for feeding back said remaining portion of the gaseous medium cooled and moistened in said wet cooling stage from the latter to and through said dry cooling stage so as to act therein as cooling medium without coming into direct contact with the raw gaseous medium, said first chamber communicating with said third chamber for a passage of said remaining portion of the gaseous medium from said dry cooling stage through said third chamber to said outlet, at least one fan in said casing for causing a flow of the gaseous medium from said inlet to said outlet, and an electromotor connected with said fan for driving same, said electromotor being arranged within said third chamber so as to be cooled by said flow of gaseous medium.

2. In an apparatus for cooling a gaseous medium as claimed in claim 1, said first chamber being arranged on top of said second chamber, and said third chamber being arranged on top of said first chamber.

3. In an apparatus for cooling a gaseous medium as claimed in claim 1, said first chamber being arranged on top of said second chamber, said third chamber being arranged on top of said first chamber, a centrifugal pump arranged in said casing for circulating a liquid through the wet cooling stage, said electromotor, said fan and said centrifugal pump being arranged coaxially with each other, and means connecting the driving shaft of the electromotor with said fan and said centrifugal pump.

MAX BERLOWITZ.